C. A. FOWLER.
BREASTPIN.
No. 10,495. Reissued July 1, 1884.
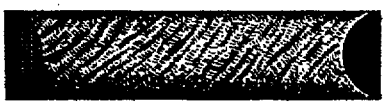
Witnesses:
Philip F. Larner.
Hodges Harte
Inventor:
Charles A. Fowler
By Wm. Wood
Attorney.
N. PETERS, Photo-Lithographer, Washington, D. C.

UNITED STATES PATENT OFFICE.

CHARLES A. FOWLER, OF NEW YORK, N. Y.

DESIGN FOR A BREASTPIN.

SPECIFICATION forming part of Reissued Design No. 10,495, dated July 1, 1884.

Original patent No. 14,502, dated December 25, 1883, for 14 years. Application for reissue filed April 2, 1884.

*To all whom it may concern:*

Be it known that I, CHARLES A. FOWLER, of the city, county, and State of New York, have invented a new and original Design for Articles of Mourning-Jewelry, of which the following is a full, clear, and exact description, reference being had to the accompanying drawing, making part of this specification, which drawing represents a front view of a breastpin which fully shows the nature of my invention.

This design is embodied in an article of mourning-jewelry to which the character of crape is thereby imparted; and the invention consists of a breastpin or other like article of mourning-jewelry, in which the surface of the body is produced partly in imitation of crape and partly smooth.

In the drawing, A represents a breastpin or other like article of mourning-jewelry. The front surface of the body is produced partly in imitation of crape *a*, and partly with smooth panels *b*, as shown in the drawing.

Having thus described my design, I claim as new and desire to secure by Letters Patent—

1. The design for mourning-jewelry, consisting of a breastpin or other like article having the crape-like surface, substantially as shown and described.

2. The design for a breastpin or other like article of mourning-jewelry, consisting of a body, the surface of which is partly in imitation of crape and partly smooth, substantially as shown and described.

In testimony that I claim the foregoing as my invention I have signed it this 24th day of March, A. D. 1884.

CHARLES A. FOWLER.

Witnesses:

GEO. S. HICKOK,
A. W. PAGE,
CHARLES STOPPELKAM.